Aug. 19, 1969     L. S HUDSON ET AL     3,461,983
CUTTING TOOL HAVING HARD INSERT IN HOLE
SURROUNDED BY HARD FACING
Filed June 28, 1967     2 Sheets-Sheet 1

INVENTORS
LESTER S. HUDSON &
EUGENE G. OTT
BY
Roy L. Van Winkle
ATTORNEY

United States Patent Office 3,461,983
Patented Aug. 19, 1969

3,461,983
CUTTING TOOL HAVING HARD INSERT IN HOLE
SURROUNDED BY HARD FACING
Lester S. Hudson and Eugene G. Ott, Dallas, Tex., assignors to Dresser Industries, Inc., Dallas, Tex., a corporation of Delaware
Filed June 28, 1967, Ser. No. 649,638
Int. Cl. E21b 9/10; C09c 1/68
U.S. Cl. 175—375                7 Claims

ABSTRACT OF THE DISCLOSURE

Apparatus that includes a member having a surface thereon exposed to an abrasive environment, the member having a relatively hard insert pressed into a hole in the member and having a hard facing material on the surface of the member surrounding the insert. A method of manufacturing the apparatus wherein the hole is plugged and hard facing material is applied to the surface around the plug. After the hard facing material has been permanently bonded to the surface, the plug is removed and the hard insert pressed into the hole to complete the apparatus.

Background of the invention

This invention relates generally to improved apparatus useful in abrasive environments and to methods of manufacturing such apparatus. More particularly, but not by way of limitation, this invention relates to an improved apparatus useful in the drilling of oil and gas wells and the like wherein the apparatus includes a member having relatively hard inserts pressed therein and a hard facing material disposed on the surface of the member surrounding the inserts.

In the process of drilling oil and gas wells and the like, various components, particularly drilling bits and related items, operate in a highly abrasive environment. Although the abrasive conditions exist in the drilling of wells wherein a liquid is utilized as the medium for cooling the bits and carrying the cuttings from the bottom to the top of the hole, the abrasive conditions are considerably more pronounced in drilling wells utilizing air or gas as the cooling and carrying medium.

Drill bit life and efficiency are of prime importance in the drilling of oil and gas wells since the penetration rate is more or less directly related to the condition of the bit. When harder formations are encountered in the drilling of the well, a bit having carbide inserts located in the body of the cutter members of the bit is generally utilized because of the ability of the inserts to penetrate the hard formations. However, the carbide inserts are mounted in a relatively soft member forming the body of the cutter member. When such bits are exposed to the abrasive conditions in the well, the relatively soft material of the cutter member body that holds the inserts is abraded or eroded away due to the presence of relatively fine cuttings from the formation and/or due to the direct blasting effect of the gas utilized in the drilling process. The wearing away of the cutter member body material is usually most pronounced on the nose or apex of conical cutter members. When the material supporting the inserts is eroded or abraded away to a sufficient extent, the drilling force exerted on the inserts, when they engage the formation, either breaks the inserts or forces them out of the cutter member altogether with the result that the bit is no longer effective in penetrating the formation.

The inserts utilized in such bits are retained in the cutter member by "hoop" tension generated when the insert is pressed into the relatively soft cutter member body. Thus, any method utilized in an attempt to alleviate the erosion of the cutter member must take into consideration that the "hoop" tension holding the inserts must be retained. It has been found to be impractical to press the inserts into the cutter member and then hard face the cutter member utilizing heat to adhere the hard facing material to the surface of the cutter member because the heating relieves the "hoop" tension.

Another method that has been utilized in an attempt to alleviate the erosion problem has been to hard face the cutter member before drilling the holes for the inserts. The difficulty in attempting to penetrate the hard facing material has shown this procedure to be impractical. Furthermore, and even when the holes for the inserts have been drilled successfully in the hard faced cutter member, pressing the inserts into the holes has resulted in cracks in the cutter member immediately surrounding the inserts. The cracks formed have relieved the "hoop" tension so that the inserts are not retained adequately and, therefore, are subject to being lost from the cutter member rather easily.

There are other portions of the bit, such as the lower end or "shirttail" of the arms which depend from the body to support the cutter members rotatably, that are also subject to the abrasion or erosion due to cuttings, and/or relatively high velocity gas. The shirttails of the bit also extend relatively close to the gage diameter of the drilled hole, that is, to the wall of the well bore, so that the shirttails are constantly exposed to the erosive effect of cuttings being carried upwardly by the drilling medium. If relatively large chips are discharged from the bit, the shirttail at times may actually perform a cutting or grinding action as such cuttings pass upwardly through the narrow annular space between the shirttail and the wall of the well bore. Consequently, it has been found that it is necessary to provide protection for the surface of the shirttail to prevent its wearing away.

Summary of the invention

Accordingly, this invention provides improved apparatus useful in an abrasive environment, wherein the apparatus includes a member having a surface exposed to the abrasive environment and having at least one hole formed therein, the member including: an insert element formed of a material harder than the member, forced into the hole in the surface of the member; and, a hard facing material deposited on the surface closely surrounding the insert element.

In another aspect, this invention provides an improved method of manufacturing apparatus useful in an abrasive environment including a member having a hard faced surface and at least one insert element formed of a material harder than the member forced into a preformed hole in the surface, the method comprising the steps of: placing a plug in the hole; placing hard facing material on the surface surrounding the plug; removing the plug; and, forcing the insert element into the hole.

One object of the invention is to provide an improved apparatus useful in an abrasive environment having a hard insert element in a member thereof and having a hard facing material deposited on the surface of the member surrounding the insert element to prevent erosion of the member and the subsequent loss of the insert element.

Another object of the invention is to provide an improved method for manufacturing a member having a hard insert element therein and having hard facing material surrounding the insert element without disturbing the tension forces in the member that retain the insert element.

Still another object of the invention is to provide an improved bit for use in drilling oil and gas wells that includes a plurality of hard insert elements pressed into the cutting member of the bit and having hard facing material deposited on the surface thereof surrounding the insert elements to prevent the erosion or abrasion of the cutting member and the subsequent loss of the insert elements.

The foregoing and additional objects and advantages of the invention will become more apparent as the following detailed description is read in conjunction with the accompanying drawings.

Bref description of the drawing

FIGS. 4–A through 4–D are enlarged views of a portion of FIG. 4 defined by the line 4—4 and arranged to illustrate one method of the invention.

Figures 2, 3:
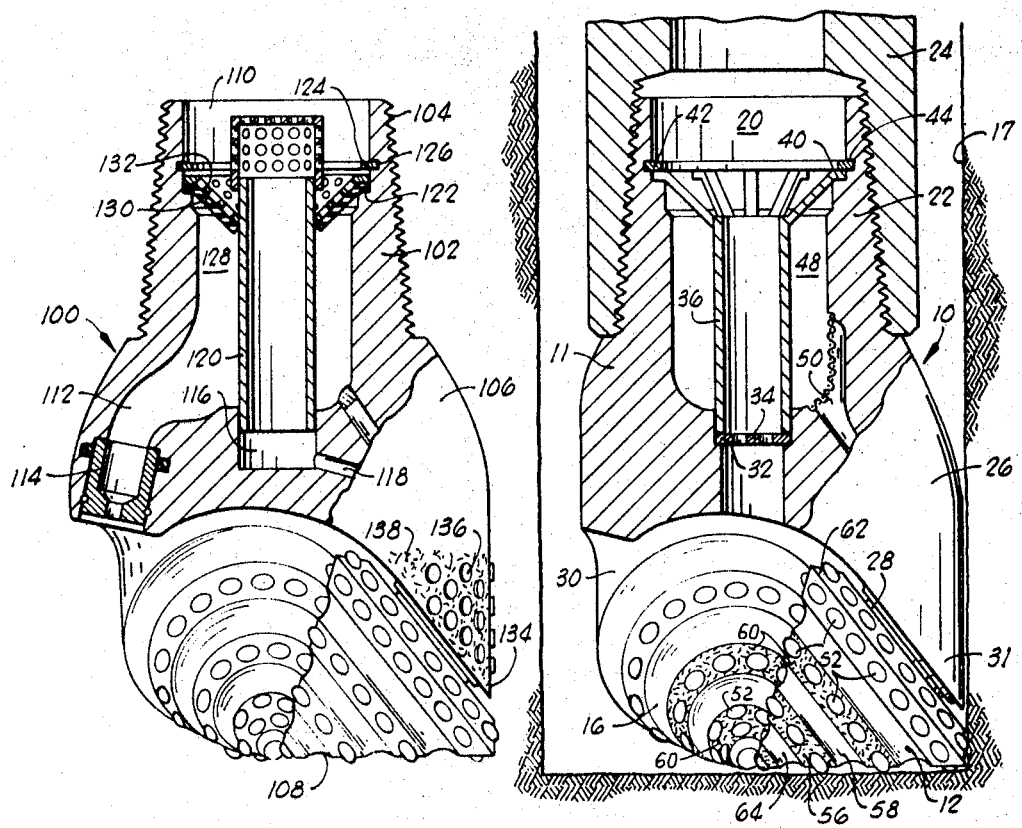
FIG. 2 is an enlarged cross sectional view of the drill bit disposed in a well bore, taken generally along the line 2—2 in FIG. 1.
FIG. 3 is an enlarged, partial cross sectional view of a portion of a cutting member removed from a drill bit.
Figure 3:
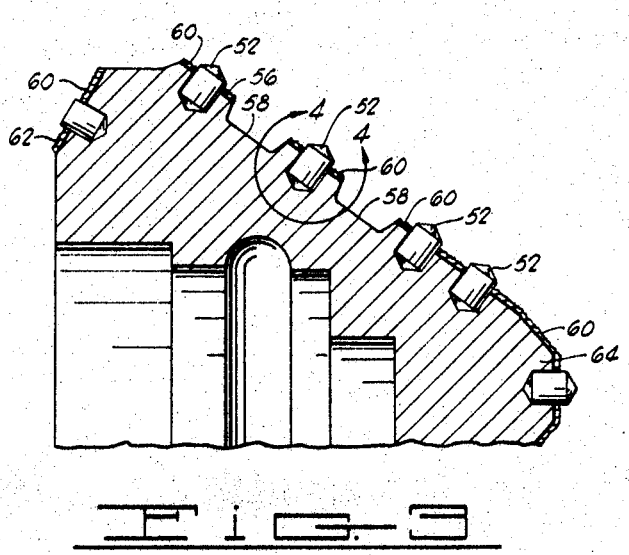
Figure 4A:
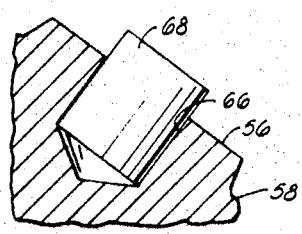
Figure 4B:
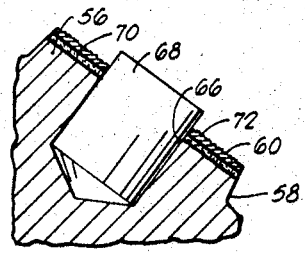
Figure 4C:
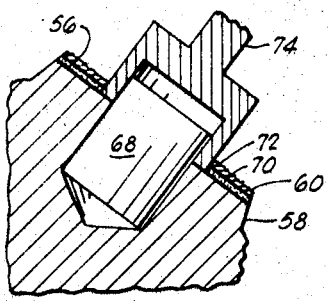
Figure 4D:
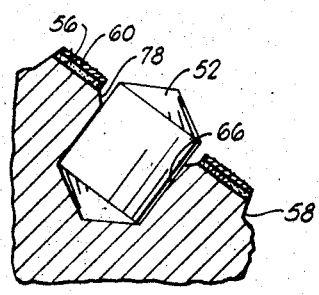

FIG. 5 is a view similar to FIG. 2, but illustrating a modified form of drill bit that incorporates features also in accordance with the invention.

Description of the preferred embodiment

Figure 1:
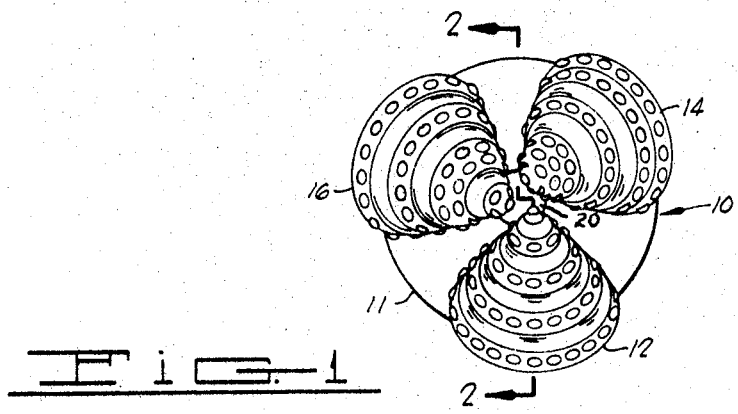
FIG. 1 is a bottom view of a drill bit incorporating cutting members constructed in accordance with the invention.

Referring to the drawing and to FIG. 1 in particular, shown therein and generally designated by the reference character 10 is a drill bit including a bit body 11 supporting three rotatable, conical cutter members 12, 14 and 16 that are constructed in accordance with the invention. Each of the cutter members is arranged so that its axis of rotation is oriented generally toward the center line of the bit 10, which coincides with the longitudinal axis of a well bore 17 as shown in FIG. 2.

A central passageway 20 extends downwardly through the bit body 11. The bit body 11, as shown clearly in FIG. 2, also includes an externally threaded pin portion 22 connected to the lower end of a string of hollow drill pipe 24, a depending arm portion 26 that is provided with a journal 28 for rotatably supporting the cutter member 12, a depending arm portion 30 that rotatably supports the cutter member 16, and a depending arm portion (not shown) that is similarly arranged to rotatably support the cutter member 14. Each of the arm portions terminates in a shirttail 31 that is disposed in close proximity to the wall of the well bore 17.

The passageway 20, which extends downwardly through the bit body 11, has its lower end reduced in diameter forming a shoulder 32 in the body 11 that supports an orifice plate 34. The lower end of a canister 36 engages and retains the orifice plate 34 on the shoulder 32. The canister 36 is supported against movement in the body 11 on an upwardly facing shoulder 40 formed in the interior of the pin portion 22 on the body 11 and by a lock-ring 42 that is disposed in an annular groove 44 formed in the pin portion 22 just above the shoulder 40.

The canister 36 is arranged to divide the flow of fluid passing through the drill pipe 25 and the passageway 20 in bit 10 into two distinct streams. One of the streams flows downwardly through the interior of the canister 36, encountering a portion of the cutter members 12, 14 and 16 and encountering the central portion of the bottom of the well bore 17. The other stream of air flows downwardly through an annular space 48 formed between the canister 36 and the wall of the bit body 11 into a plurality of cooling passageways 50 communicating with bearings (not shown) that are operably disposed between the journal 28 and the relatively rotatable cutter members. Comparatively, a relatively small volume of the circulating medium flows through the cooling passageways 50 to the bearings while a relatively large volume at high velocity flows through the orifice plate 34 cleaning the well bore 17 and carrying the cuttings to the surface.

As might be expected, the cutters 12, 14 and 16 are subjected to the direct blast of the fluid flowing through the orifice plate 34 as well as to effects of the fluid deflected from the bottom of the well bore 17. Also, the cutter members are rotating continuously in the cuttings generated as the cutter members engage the bottom of the well bore 17. Thus, the cutter members are subjected to extremely abrasive and/or erosive conditions that tend to wear, erode or abrade the material forming the cutter members.

Each of the cutter members 12, 14 and 16 is provided with a plurality of spaced, circumferential rows of inserts 52. The inserts 52 are preferably formed from an extremely hard material, such as carbide. The inserts 52 function to penetrate and, to some extent, disintegrate the formations encountered by the bit 10 during the drilling of the well bore 17.

As previously mentioned, the body of the cutter members is formed from a relatively soft material as compared to the material used in forming the inserts 52. Thus, as the bit 10 encounters the abrasive and erosive conditions existing in the well bore 17, the tendency is for the relatively soft material to be eroded or abraded away from the inserts 52 so that the inserts are either broken or lost, reducing the effectiveness of the bit 10.

The partial, cross sectional view of FIG. 3 illustrates a typical cutter member that includes a plurality of the inserts 52. As illustrated in the various figures of the drawing, the cutter members include a plurality of lands 56 and grooves 58 with the inserts 52 located in the lands 56. As can be seen in FIGS. 1 and 2, the lands 56 and grooves 58 extend circumferentially about the periphery of the conical cutter members 12, 14 and 16.

The surface of each of the lands 56 is covered with a hard facing material 60 by a process that will be described hereinafter. The provision of the hard facing material 60 on the lands 56 adjacent the inserts 52 serves to increase the life and effectiveness of the bit 10 by substantially reducing the abrasion and/or erosion of the relatively soft cutter member material that supports the inserts 52.

FIG. 3 illustrates the disposition of hard facing material 60 on all exterior surfaces (excepting the grooves 58) of the typical cutter member including a gage surface 62 and an apex surface 64. It will be understood that the greatest wear occurs generally in the vicinity of the apex surface 64 and the adjacent two or three rows of inserts 52. However, hard facing material can be used effectively on all surface areas of the cutter member 54 if desired.

As previously mentioned, the inserts 52 are retained in the typical cutter member by the "hoop" tension generated in the cutter member as the inserts 52 are pressed therein. FIGS. 4–A through 4–D illustrate a method utilized to successfully hard face the lands 56 in the immediate vicinity of the inserts 52 without losing the "hoop" tension.

When the cutter member has been machined to the desired configuration providing the lands 56 and grooves 58, the lands are protectively coated and the cutter member is carburized. After annealing, the desired number and arrangement of inserts is determined and a hole 66 is drilled tightly receiving each insert in the appropriate land 56. As shown in FIG. 4–A, a short section of a cylindrical rod 68 is then placed in the hole 66. The rod 68 should be of a size that will be received closely in the hole 66. The material forming the rod 68 should have sufficient structural strength to resist deformation of the hole during application of the hard facing material 60, and, preferably, is a material that can be removed easily after the hard facing material 60 has been applied.

After the rod 68 has been inserted in the hole 66, the surface of the cutter member, that is, the surface of the land 56, is pre-heated. After heating the land 56, the surface of the land adjacent the rod 68 is painted with a bonding agent, such as a silicate 70, covering the area that is to be hard faced. A relatively fine particulate carbide 72 is then sprinkled on the silicate 70 as shown in FIG. 4–B. Manifestly, any suitable type of hard facing material can be utilized with or without a bonding agent as required.

As the silicate 70 begins to harden, a scraping tool 74 (see FIG. 4–C) is inserted over the exposed end of the rod 68 and rotated to remove a very small annular area of the hard facing material 60 adjacent and encircling the rod 68. When the hard facing material has been removed, heat is applied to the hard facing material 60 in any suitable manner, such as by the use of an atomic hydrogen or oxy-acetylene torch to permanently bond the hard facing material 60 to the surface of the land 56.

Upon completion of the application of the hard facing material 60 and after the cutter member has been heat treated again, the rod 68 is drilled or otherwise removed from the hole 66. A suitable tool is inserted in the hole 66 to form a very small chamfer 78 (see FIG. 4–D) in the annular area wherein the hard facing material 60 has been removed. Chamfering the hole 66 relieves any stresses that may exist along the edge of the hole 66, removes any particles that may be in the hole and provides a lead-in or guide for the insert 52 which is pressed into the hole 66 after the chamfer 78 has been formed.

The method described hereinbefore provides for the application of the hard facing material 60 to the lands 56 to prevent their erosion or abrasion and, yet, does not destroy the ability of the cutter member 56 to provide the tension force necessary to maintain the insert 52 in the hole 66. At the same time, the foregoing procedure avoids the formation of stress cracks that generally have occurred when other methods were attempted.

In operation, the bit 10 and the attached drill pipe 24 are lowered into the well bore 17 until the cutter members 12, 14 and 16 engage the bottom of the well bore 17. After reaching the bottom of the well bore 17, rotation is imparted to the drill pipe 24 and the bit 10. As the bit 10 rotates, the drilling medium is pumped downwardly through the interior of the drill pipe 24 to the bit 10.

Upon reaching the passageway 20 in the bit 10, the drilling medium is divided by the canister 36 and one portion thereof flows through the annular space 48 into the cooling passageways 50. The portion of the air flowing through the cooling passageways 50 enters the bearings (not shown), cooling the bearings as the cutter members 12, 14 and 16 rotate on their respective journals.

The second portion of the air flows through the interior of the canister 36, through the orifice plate 34 and is discharged in a downward direction from the reduced portion of the passageway 20 in the bit 10. As the air leaves the passageway 20, it engages the apex portions 64 of the various cutter members and, generally, the first two or three rows of inserts 52. When air is used as the drilling medium, the erosive effect thereof on the cutter members can be understood readily.

Also, the air or drilling medium leaving the passageway 20 encounters the central portion of the bottom of the well bore 17 resulting in a considerable turbulence therein which subjects the cutter members 12, 14 and 16 to the erosive and abrasive effects of cuttings from the bottom of the well bore 17 that are entrained in the drilling medium. The air flows past the cutter members 12, 14 and 16, upwardly past the shirttails 31, to the surface of the well bore 17 through the annular space between the exterior of the drill pipe 24 and the wall of the well bore 17.

Embodiment of FIG. 5

The partial cross sectional view of FIG. 5 illustrates another embodiment of drilling bit generally designated by the reference character 100. The bit 100 includes a bit body 102 having an externally threaded pin portion 104 and a plurality of depending arm portions 106, each of which rotatably supports a cutter member 108 and that is preferably constructed as previously described.

The bit body 102 has a cavity 110 extending downwardly therein. The cavity 110 is in fluid communication with a plurality of jet passageways 112 that have their outlet ends located between adjacent cutter members 108.

A jet nozzle 114 is located in the exit ends of each jet passageway 112. The jet nozzles 114 are arranged to direct the drilling medium flowing therethrough at a relatively high velocity onto the bottom of the well bore generally between the cutter members 108.

The cavity 110 also includes a relatively small recess 116 that is located in the lower end of the body member 102. The recess 116 is in fluid communication with a plurality of cooling passageways 118 that are located in each of the arm portions 106 and arranged to cool the bearings (not shown) journalling the rotatable cutter members 108 on the arm portions 106.

As shown clearly in FIG. 5, the recess 116 is sized to receive the lower end of a canister valve 120. The canister valve 120 is supported in the bit body 102 against downward movement on an annular shoulder 122 that is formed in the upper portion of the body 102. Movement of the canister valve 120 upwardly out of the cavity 110 is prevented by a lock-ring 124 that is located in annular groove 126 also formed in the bit body 102.

The canister valve 120 functions to divide the drilling medium flowing downwardly through the cavity 110 into two separate streams. One stream flows downwardly through the interior of the canister valve 120 into the recess 116 and through the cooling passageways 118 to the bit bearings (not shown). The other flow stream passes downwardly through an annular space 128 between the exterior of the canister valve 120 and the wall of the bit body 102 into the jet passageways 112.

As illustrated, the canister valve 120 includes a plurality of flexible flappers 130 arranged to permit flow downwardly through the annular space 128, but to prevent flow upwardly therethrough by the engagement of the resilient flappers 130 with a perforated portion or screen 132 of the canister valve 120. The purpose of preventing upward flow through the annular space 128 is to prevent water, which may be encountered during the drilling of a well bore, from passing upwardly into the upper end of the cavity 110 of the bit 100 and downwardly therefrom through the interior of the canister valve 120 into the bit bearings.

Each of the arm portions 106 of the bit 100 includes a shirttail portion 134 which, during drilling of a well bore, are disposed relatively close to the wall of the well bore as previously mentioned in connection with the embodiment of FIG. 2. The shirttails 134 in the embodiment of FIG. 5 are provided with a plurality of relatively hard inserts 136 arranged in any suitable pattern thereon. Disposed on the surfaces of the shirttails 134 and closely surrounding the inserts 136 is a hard facing material 138.

The shirttails 134, which are disposed relatively close to the wall of the well bore, are subjected to highly erosive and abrasive conditions as the cuttings move upwardly to the surface of the well. Also, such conditions may result from the inadvertent engagement of the shirttails 134 with the wall of the well bore. Therefore, it is desirable to provide the inserts 136 and hard facing 138 on the shirttails 134 to increase the life of the bit. Particularly, the leading edge, that is, the edge of the shirttail facing in the direction of rotation, is subjected to such extreme wear conditions.

In order to prevent loss of the inserts 136 from the shirttails 134, it is preferred that the hard facing 138 and the inserts 136 be placed in the shirttails 134 by the process previously described in connection with FIG. 4, that is, by the process described for installing the hard facing material 160 on and the inserts 52 in the cutter members.

While the use of the inserts 136 and hard facing 138 on the shirttails 134 has been mentioned in connection with only the embodiment of FIG. 5, it will be apparent to those skilled in the art that the shirttail inserts and hard facing may be used also in the bit 10 described in connection with FIG. 2.

Furthermore, there are numerous other well tools such as reamers, hole enlargers, big hole bits, and similar devices that are subjected to the extreme abrasive and erosive conditions encountered during the drilling of wells and the like with which the inserts and associated hard facing can be used to advantage and it will be understood that the process and apparatus described hereinbefore is intended for such use.

The embodiments of the invention in which an exclusive property or privilege is claimed are defined as follows:

1. Apparatus useful in an abrasive environment, said apparatus including:
   a member having surface exposed to said environment and having at least one hole formed therein;
   hard facing material deposited on said surface, said hard facing material being located proximate said hole without overlying any portion of said hole; and,
   an insert element formed of a material harder than said member and larger than said hole, said insert being retained in said member by stresses in said member when said insert element is forced into said hole.

2. Apparatus used in drilling oil and gas wells or the like comprising:
   a plurality of cutter members adapted to engage the formations encountered during the drilling of the oil and gas well, each said cutter member having a plurality of holes therein and including
      hard facing material disposed on and substantially covering the surface of said cutter members proximate said holes without overlying any portions of said holes, and
      a plurality of insert elements formed of a material harder than said cutter members and larger than said holes, said insert elements being retained in said cutter members by stresses in said members when said insert elements are forced into said holes, said inserts projecting from the surfaces of said cutter members; and,
   a body member rotatably supporting said cutter members in a position wherein said insert elements are arranged to engage the formations.

3. The apparatus of claim 2 wherein:
   said cutter members are of generally conical configuration and the apex of each of said conical cutter members is oriented generally toward the longitudinal axis of the well; and,
   said body member includes a plurality of depending arm portions, each of said arm portions being provided with a journal oriented generally toward the longitudinal axis of the well and rotatably supporting one of said cutter members.

4. The apparatus of claim 3 wherein:
   each of said conical cutter members includes a plurality of rows of circumferential lands and grooves and a plurality of said insert elements located in each of said lands; and, wherein
   the surface of said lands are covered with said hard facing material.

5. The apparatus of claim 4 wherein each said arm has a plurality of holes therein located in a surface thereof that is arranged to be disposed adjacent the wall of the well bore, each said arm portion including:
   hard facing material disposed on and substantially covering said surface proximate said holes without overlying any portion of said holes; and,
   a plurality of insert elements formed of a material harder than said arm portions and larger than said insert elements being retained in said arm portions by stresses in said arm portions when said insert elements are forced into said holes.

6. The apparatus of claim 3 wherein:
   each of said conical cutter members includes at least one of said insert elements located therein and projecting from the surface thereof adjacent the apex of each cutter member; and, wherein
   said hard facing material is disposed on the surface of the apex of said conical cutter members proximate said holes without overlying any portion of said holes.

7. Apparatus for use in drilling oil or gas wells or the like comprising:
   a plurality of cutter members; and,
   a body member including a plurality of depending arm portions, each said arm portion rotatably supporting one of said cutter members and having
      a plurality of holes in the surface of said arm portions arranged to be located adjacent the wall of the well bore,
      hard facing material disposed on and substantially covering said surfaces proximate said holes without overlying any portion of said holes, and
      a plurality of insert elements formed of a material harder than said arm portions and larger than said holes, said insert elements being retained in said arm portions by stresses in said arm portions when said insert elements are forced into said holes.

References Cited

UNITED STATES PATENTS

| | | | |
|---|---|---|---|
| 2,020,117 | 11/1935 | Johnston | 125—39 X |
| 2,582,231 | 1/1952 | Catallo | 175—329 X |
| 3,389,761 | 6/1968 | Ott | 175—374 |

FOREIGN PATENTS

| | | |
|---|---|---|
| 707,171 | 4/1954 | Great Britain. |

ERNEST R. PURSER, Primary Examiner

U.S. Cl. X.R.

51—309